United States Patent [19]

Mehta et al.

[11] Patent Number: 5,141,799
[45] Date of Patent: Aug. 25, 1992

[54] LOW SCRATCH, ABRASION-RESISTANT OVERLAY AND DECOR PAPERS

[75] Inventors: Mahendra Mehta, Pittsfield; Richard D. Brownhill, Lee; William M. Stanard, Jr., Sheffield, all of Mass.

[73] Assignee: The Mead Corporation, Dayton, Ohio

[21] Appl. No.: 672,374

[22] Filed: Mar. 20, 1991

Related U.S. Application Data

[63] Continuation-in-part of Ser. No. 565,547, Aug. 10, 1990, abandoned.

[51] Int. Cl.⁵ .............................. B32B 5/16; B32B 7/00
[52] U.S. Cl. .................................... 428/207; 428/206; 428/211; 428/220; 428/331; 428/452; 428/438; 428/908.8; 428/530; 428/531; 162/134
[58] Field of Search ............... 428/220, 211, 207, 144, 428/145, 143, 206, 530, 531, 452, 438, 331, 908.8; 162/134–137, 225, 128

[56] References Cited

U.S. PATENT DOCUMENTS

| | | | |
|---|---|---|---|
| Re. 30,233 | 3/1980 | Lane et al. | |
| 3,135,643 | 6/1964 | Michl | 428/211 X |
| 3,373,070 | 3/1968 | Fuerst | 428/531 X |
| 3,373,071 | 3/1968 | Fuerst | 428/531 X |
| 4,305,987 | 12/1981 | Scher et al. | 428/149 X |
| 4,327,141 | 4/1982 | Scher et al. | 428/149 X |
| 4,505,974 | 3/1985 | Hosler | 428/530 X |
| 4,880,689 | 11/1989 | Park et al. | |
| 4,971,855 | 11/1990 | Lex et al. | 428/206 |

FOREIGN PATENT DOCUMENTS 987217 4/1976 Canada .

*Primary Examiner*—P. C. Sluby
*Attorney, Agent, or Firm*—Thompson, Hine and Flory

[57] ABSTRACT

Abrasion-resistant overlay and multiple layer decor paper sheets suitable for the production of decorative laminates are disclosed comprising an agglomerated abrasion-resistant amorphous silica powder. These overlays and decor sheets reduce caul plate scratching during lamination.

16 Claims, No Drawings

LOW SCRATCH, ABRASION-RESISTANT OVERLAY AND DECOR PAPERS

CROSS-REFERENCE TO RELATED APPLICATION

This is a Continuation-in-Part of U.S. Pat. Application Ser. No. 565,547, filed Aug. 10, 1990.

BACKGROUND OF THE INVENTION

1. Field of the Invention

The present invention relates to decorative laminates having an abrasion-resistant character which can be manufactured without scratching the caul plates and, more particularly, to overlays and multiple layer decor sheets with low scratch and abrasion resistant characteristics.

2. Description of Prior Art

High-pressure decorative laminates are laminated articles comprising plural layers of synthetic resin impregnated paper sheets consolidated or bonded together into a unitary structure under high heat and pressure. Conventionally, the decorative or print layer is a sheet of high quality cellulose fiber and fillers impregnated with a thermosetting condensation resin such as melamine formaldehyde resins. The decorative sheet may be overlaid with a low basis weight transparent sheet, which is also a sheet of cellulose impregnated with melamine formaldehyde resin. These sheets are bonded to a plurality of core or body sheets of a fibrous cellulosic material, usually unbleached Kraft paper, impregnated with a thermosetting phenol-formaldehyde resin. Typically, seven or eight core sheets are consolidated with only a single decorative sheet and a single overlay sheet to form a decorative laminate.

Decorative laminates are useful as surfacing materials in products ranging from table and counter tops to floors. In applications such as these, decorative laminates are imparted with functional properties to protect the decorative sheet from abrasive wear and tear, heat, moisture, chemicals and the like.

It is well known in the prior art that abrasion-resistance can be increased by incorporating mineral particles into the decorative layer, or by covering the decorative layer with a transparent overlay layer that incorporates such mineral particles.

U.S. Pat. No. 4,505,974 discloses a mar-resistant decorative laminate with an outermost layer containing mineral particles ranging in size from 0.005 to 0.1 microns. The minerals are silica and/or alumina and are positioned in the outermost 25 microns of the overlay.

Canadian Pat. No. 987,217 discloses a print receptive decor paper comprising print receptive fibers and abrasion resisting mineral particles, such as silica and/or alumina, having a hardness of 7-10 on the Mohs scale and an average particle size ranging from 10-75 microns.

Canadian Pat. No. 990,632 discloses an abrasive-resistant overlay sheet having embedded in its top surface particles, such as silica and/or alumina, having a size of 10 microns or greater in diameter, and having a Mohs' hardness of at least 8.0.

U.S. Pat. No. Re. 30,233 discloses a multi-layer decor sheet having abrasion-resisting mineral particles incorporated in the surface layer thereof. The multiple-layer decor paper is made up of a base layer of fibers and opacifying fillers, and a surface layer comprising fibers and abrasion resistant mineral particles. This sheet additionally may include an intermediate layer containing decorative inclusions. The surface layer is resin impregnated and thus no overlay is required, although one may be provided. The mineral particles disclosed have a hardness of 7 or more on the Moh hardness scale.

The overlays and multilayer decor papers of the prior art have been made with abrasion resistant materials such as silica, alumina, silicates, glass fibers, asbestos and the like which have been incorporated into the overlays and decor papers by various procedures. Overlays and decor papers made from such materials, however, have not been generally satisfactory for a number of reasons. Previous abrasion-resistant decor paper layers and overlays typically contain 1-30% by weight of a high hardness alumina in the 10-100 micron particle size range. Alumina particles less than 10 microns do not provide sufficient abrasion resistance to pass the NEMA standard for abrasion-resistant laminates. The particles with high hardness and larger particle size cause unacceptable caul plate scratching. This has necessitated refinishing the caul plates after 1-10 laminating cycles.

The purpose of this invention is to provide an overlay and multiple layer decor paper layer that reduces caul plate scratching while providing satisfactory abrasion resistance.

SUMMARY OF THE INVENTION

The present invention relates to an abrasion-resistant overlay and a multiple layer decor sheet suitable for use in the production of decorative laminates. The overlay and decor papers of the present invention contain agglomerates of an abrasion-resistant particulate matter that reduces caul plate scratching while still imparting the desired abrasion-resistant properties to decorative laminates.

The abrasion-resistant particulate matter used in the present invention is amorphous silica powder with a preferred ultimate particle size range of about 0.01 to 0.05 microns in diameter and a preferred agglomerate size range of about 12.0 to 30.0 microns in diameter.

In one embodiment of the present invention, an overlay paper is provided which contains an abrasion resistant agglomerate as described herein. The abrasion-resistant agglomerates may be uniformly distributed throughout the overlay paper or the abrasion-resistant agglomerates may be distributed across and fixed to the top surface of the overlay paper as described herein.

In another embodiment of the present invention, a multiple layer decor paper is provided of the type described in U.S. Pat. No. Re. 30,233 in which the surface layer of the decor paper contains the abrasion resistant agglomerate as described herein. Preferably, this decor sheet is printed as described in U.S. Pat. No. Re. 30,233. The abrasion-resistant agglomerates may be uniformly distributed throughout the surface layer of a multiple layer decor paper or the abrasion-resistant agglomerates may be uniformly distributed across the top surface of the outermost layer of the decor paper as described herein.

The present invention is also directed to an abrasion-resistant decorative laminate comprising a core, and an abrasion-resistant multiple layer decor paper disposed on said core wherein the surface layer of the decor paper contains the abrasion resistant agglomerate described herein.

The present invention also relates to an abrasion-resistant decorative laminate comprising a core, a decor paper (not containing the agglomerate) and the abrasion-resistant overlay containing the abrasion resistant agglomerate described herein.

Accordingly, it is an object of the present invention to produce an overlay sheet and/or multiple layer decor paper with low scratch and abrasion-resistant characteristics.

A further object of the present invention is to produce decorative laminates having an abrasion-resistant character which can be manufactured with reduced scratching of the caul plates.

These, and other objects, will be readily understood by one skilled in the art, as reference is made to the following detailed description of the present invention.

DETAILED DESCRIPTION OF THE INVENTION

In accordance with this invention, it has been found that by using materials with ultimate particle size less than 0.05 microns, but particle agglomerates greater than 10 microns and preferably from 12.0 to 30.0 microns in overlays and multiple layer decor sheets, both abrasion resistance and caul plate scratching requirements can be met. The agglomerated structure and low hardness of the amorphous silica provides the desired performance.

While those skilled in the art will appreciate that many abrasion-resistant agglomerates can be used in the present invention, the preferred agglomerates have a Mohs hardness of about 3.0 to 6.0, an agglomerate size of about 12.0 to 30.0 microns and an ultimate particle size of about 0.01 to 0.05 microns. In accordance with this invention, an agglomerated amorphous silica powder is preferably used which has a Mohs hardness of about 3.0. The use of particles of lower Mohs hardness such as these permits the production of abrasion resistant papers having less abrasion resistance than those produced with such materials as alumina, but with the advantage of eliminating caul plate scratching during laminate production. Alumina with a Mohs hardness of 9.0 and a particle size of 10.0 to 50.0 microns can result in caul plate scratching even at a loading of 0.5% of fiber. Overlays or outermost decor paper layers with alumina particles will fail the caul plate scratching test.

Amorphous silica powder, manufactured under the trade name "Sansil", by PPG is a suitable abrasion resistant agglomerate for use herein. Amorphous silica powder is precipitated and structured in such a way that it forms agglomerates. In principal, amorphous silica is less abrasive than silica and other harder materials used in the prior art. Amorphous silica powder of the above specified type has an ultimate particle range of about 0.01 to 0.05 microns in diameter and a mean particle agglomerate range of 12.0 to 30.0 microns. In this invention, agglomerates ranging from 10–30 microns of silica particles of about 0.01–0.05 microns are believed to provide abrasion resistance without scratching caul plate surfaces. The use of materials having a particle size within this range can generally be satisfactorily used in producing abrasion-resistant laminates that do not scratch caul plates.

An abrasion-resistant overlay sheet can be produced in various ways. One method for preparing an abrasion resistant overlay is to mix the abrasion resistant agglomerate with the paper furnish and to form the desired overlay layer in a manner which is otherwise conventional in the art. Generally, the abrasion resistant agglomerate is added to the furnish in an amount of about 0.5 to 20% by weight (dry) and more preferably about 1 to 7% by weight (dry). At higher amounts, the abrasion resistance is enhanced but clarity of the overlay is sacrificed.

A second method for preparing abrasion resistant overlay sheets comprises uniformly adding amorphous silica in the form of an aqueous slurry to the surface of a wet web of paper through a secondary headbox of a papermaking machine such that the amount of silica is about 1 to 7% dry weight. It is not necessary to use either a size or binder. This method requires the secondary head box be positioned before vacuum boxes of a standard papermaking machine. This procedure fixes the abrasion-resisting agglomerate to the upper surface of the sheet and thus makes large percentages of the particles available to provide abrasion resistance to the layer and reduce caul plate scratching.

An additional embodiment of the present invention comprises preparing various types of beaten cellulose pulp by conventional means and subsequently transferring the thus prepared pulp to a papermaking machine where the pulp is converted in a conventional manner to paper sheet form. While still in the form of a wet web of paper, the required amount of abrasion-resisting agglomerate is applied to the surface of this wet web from a secondary headbox of a papermaking machine preferably in the form of an aqueous slurry. The resulting wet sheet containing abrasion-resisting particles is next subjected to wet pressing, preferably through one or more conventional wet presses, whereby the bonding of the abrasion-resisting particles to and in the cellulose sheet is facilitated, and also to provide a smooth sheet. Both the wet pressing and the subsequent drying of the abrasion-resisting treated sheet may be effected by any conventional means. Addition of a small amount of pulp fibers, such as 2% to the slurry of the agglomerate in the secondary headbox has been found to assist in keeping the slurry dispersed and improve the bond of abrasive material to the primary web.

A combination of the first and second or third methods described above can also be used.

Overlays having a basis weight ranging from 12 lbs. to 35 lbs. can be produced using amorphous silica. The caul plate scratching will be reduced and the level of abrasion-resistance will depend upon the amount of amorphous silica and basis weight of the overlay.

The multiple layer printed decor of this invention has a base layer comprising fibers and most often, opacifying pigments such as titanium dioxide, although for some end uses of laminates where opacity of the decor is not required, the base layer may be free of opacifying pigments. Additionally, the base layer may contain strengthening agents, and formation and retention aids, all as known in the art. The weight per ream of the base layer is not critical, and may range from 10 to 100 lbs. or more per ream of 500 sheets, 24"×36" (3000 sq. ft.) A preferred range is from 30 to 100 lbs./3000 sq. ft., and very suitable opaque decors can be produced from base layers of 60 lbs./3000 sq. ft.

Such base layers are formed on the wire of a conventional paper machine having one or more secondary headboxes, with the fiber stock for the base layer delivered to the forming wire by means of a primary headbox, all as well known in the art.

To the formed, wet base layer, while still carried by the forming wire of the paper machine is added a top layer comprising abrasion resistant agglomerate. This top layer may also include fibers. The amount of abrasion resistant agglomerate in the top layer may range from 2 to 100% based on the total weight of the top layer. In one embodiment, the top layer contains 100% abrasion resistant agglomerate. In another embodiment, the top layer may contain 25% abrasion resistant agglomerate and 75% fibers. In general, the base layer must be fairly well formed but not too free of water, prior to application of the top layer, to allow the top layer components to partially mix and combine with the base layer. The dandy roll and wet presses help to accomplish the bonding together of the base and top layers, but the top layer will consist essentially of the composition as applied from the secondary headbox.

Generally speaking the particles are adequately retained in the top layer by entanglement with the fibers present. However, if more positive retention is desired, a small amount of an adhesive such as starch may be incorporated in the top layer, or a thin layer of additional fibers may be applied over the top layer to intermingle and bond the mineral particles therein. Such additional fibers are suitably applied by a tertiary headbox, in an amount of the order of 2 lbs./3000 sq. ft.

Depending on the end-use properties desired in the laminates to be manufactured using the multiple layer decor of this invention, the amount of top layer applied to the base layer can range from 1 to 20 lbs./3000 sq. ft., with a preferred range of 4 to 14 lbs./3000 sq. ft. (dry basis). Excellent results are obtained with a top layer amounting to 4 to 10 lbs./3000 sq. ft. dry basis.

After deposition of the top layer over the base layer by means of a secondary headbox on the paper machine, the wet, double layer web is pressed, dried and may be calendered, all as known in the art, followed by application of a decorative printed pattern to the surface of the top layer to yield the multiple-layer decor paper of this invention.

Similarly, the base layer of the multiple layer decor of this invention may utilize fibers of a wide variety, these being selected to impart desired properties in finished laminates to meet particular end-use requirements. For example, the base layer may comprise asbestos or glass fibers where flame resistance is desired, and synthetic organic fibers may be used, such as nylon, rayon, acrylic, polyolefin and the like.

The core of the laminate may be of any desired type, and such cores as wood, particle board, plaster board, asbestos board and the like are contemplated as being within the scope of the invention, as well as the commonly used plies of unbleached kraft paper impregnated with resins such as phenolaldehyde resins.

Selection of the resin for impregnation of the multiple layer printed decor will largely be governed by the intended end use of the finished laminate. Aminoplasts such as melaminealdehyde resins, acrylics such as polyacrylonitrile, polyester resins such as diallyl phthalate, phenolic resins, polyurethanes, and epoxy resins may be used. These resins are widely used in the art.

The overlay can be formed from fibers conventionally used for this purpose. One of the most common fibers is alpha cellulose or mixtures thereof with other cellulose fibers. Also useful is a high bleached kraft pulp or alpha pulp beaten to a Canadian Standard Freeness of about 500 ML.

The following example is given to illustrate more specifically the abrasion-resistant properties of laminates manufactured with the overlay of the present invention. It will be understood, however, that applicants are not limited to the specific procedures and products shown in this specific example and it is comprehended that similar results could be shown using the decor paper layer.

In the results shown in this example, the abrasion resistance of the overlay sheets was determined by using the standard NEMA procedure LD 1-2.01. In this test, a small circular disc cut from the laminate containing the abrasion-resistant overlay was mounted on a revolving turntable and subjected to the abrasive action of standard abrasion strips wrapped around the periphery of the rotating wheels, the grindings being continually removed by a vacuum attachment adjacent to the surface being abraded. The total number of revolutions of the turntable holding the laminate were counted and a disc weighed before and after the test to determine the weight lost per one hundred revolutions. The number of revolutions necessary to wear away 50% of the printed pattern was used as an end point.

EXAMPLE 1

Laboratory overlay handsheets were made containing 100 parts cellulose pulp and 10–15 parts amorphous silica powder with ultimate particle size of 0.025 microns and a mean particles agglomerate size of 20 microns. 1% wet strength resin was added to allow resin saturating and basis weight was 26 lbs. per 3000 sq. ft. The ash was maintained less than 7%. At higher ash, the clarity of overlay is sacrificed without much improvement in abrasion. Laboratory laminates were made using melamine formaldehyde resin. Abrasion resistances and caul plate scratching results are as follows compared to normal production results.

| SAMPLE | ABRASIVE AMOUNT | MATERIAL SIZE | ABRASION RESISTANCE | CAUL PLATE SCRATCH |
|---|---|---|---|---|
| SHS113-3 | 3.7% | *0.025 microns | 508 cycles | Pass |
| SHS113-4 | 6.3% | *0.025 microns | 600 cycles | Pass |
| SHS113-8 | 0.6% | 15 microns | 567 cycles | Fail |
| SHS113-9 | 1.3% | 15 microns | 682 cycles | Fail |
| Normal Production | 0.5% | 41 microns | 500 cycles | Fail |

*Ultimate particle size forms 12 micron agglomerates

Having described the invention in detail and by reference to preferred embodiments thereof, it will be apparent that modifications and variations are possible without departing from the scope of the invention defined in the appended claims.

What is claimed is:

1. An abrasion-resistant overlay sheet suitable for use in the production of decorative laminates consisting essentially of a cellulosic sheet containing an agglomerated, abrasion-resistant amorphous silica powder having a Mohs hardness of 3.0 to 6.0

2. The abrasion-resistant overlay sheet of claim 1, wherein said agglomerated, abrasion-resistant amorphous silica powder is present in an amount of about 1 to 7% by weight based on the dry weight of said abrasion-resistant sheet.

3. The abrasion-resistant overlay sheet of claim 2, wherein said agglomerated, abrasion-resistant amorphous silica powder ranges in size from about 12.0 to 30.0 microns in diameter and has an ultimate particle size which ranges from about 0.01 to 0.05 microns.

4. The abrasion-resistant overlay sheet of claim 3 comprising a top surface and a bottom surface wherein said agglomerate is fixed to said top surface of said overlay sheet.

5. The abrasion-resistant overlay sheet of claim 3 wherein said agglomerated, abrasion-resistant amorphous silica powder is uniformly distributed throughout said overlay.

6. An abrasion-resistant decorative laminate comprising a core, a decor paper overlying said core and an abrasion-resistant overlay sheet disposed on the outermost surface of said decor paper, said overlay sheet consisting essentially of a cellulosic sheet containing an agglomerated, abrasion-resistant amorphous silica powder having a Mohs hardness of about 3.0 to 6.0.

7. The abrasion-resistant decorative laminate of claim 6, wherein said agglomerated, abrasion-resistant amorphous silica powder makes up about 1 to 7% by weight, based on the weight of said abrasion-resistant overlay sheet.

8. The abrasion-resistant decorative laminate of claim 7, wherein said agglomerated, abrasion-resistant amorphous silica powder ranges in size from about 12.0 to 30.0 microns in diameter and has an ultimate particle size which ranges from about 0.01 to 0.05 microns in diameter.

9. The abrasion-resistant decorative laminate of claim 8, wherein said abrasion-resistant overlay sheet comprises an outer surface and an inner surface wherein said agglomerate is fixed to the outer surface of said abrasion-resistant overlay sheet.

10. The abrasion-resistant decorative laminate of claim 8 wherein said agglomerate is uniformly distributed throughout said abrasion-resistant overlay sheet.

11. A process for the production of an abrasion-resistant overlay sheet which comprises adding an agglomerated, abrasion-resistant amorphous silica powder having a Mohs hardness of 3.0 to 6.0 to a fiber furnish for said sheet, distributing said furnish on a wire of a papermaking machine and forming said sheet such that said agglomerated, abrasion-resistant amorphous silica powder is uniformly distributed throughout said sheet.

12. A process for the production of an abrasion-resistant overlay sheet suitable for the production of decorative laminates which comprises uniformly distributing an agglomerated, abrasion-resistant amorphous silica powder having a Mohs hardness of 3.0 to 6.0 onto a first surface of a wet cellulosic sheet and pressing said first surface of said sheet to fix said agglomerated, abrasion-resistant amorphous silica powder onto said first surface of said sheet.

13. An abrasion-resistant multiple layer decor sheet comprising a paper base layer and a top layer integral with said base layer and containing about 2 to 100% by weigh of an agglomerated, abrasion-resistant amorphous silica powder having a Mohs hardness of 3.0 to 6.0.

14. The decor sheet of claim 13 wherein said top layer has a basis weight of about 1 to 20 lbs. per ream of 3000 sq. ft. and said base layer has a basis weight of about 10 to 100 lbs. per ream of 3000 sq. ft.

15. The decor sheet of claim 14 wherein printing is present on the outermost surface of said top layer.

16. An abrasion-resistant laminate comprising a core; a resin impregnated, abrasion-resistant multiple layer decor paper disposed on said core, said decor paper comprising a base layer of fibers and opacifying pigments and a top layer integral with said base layer, said top layer containing 2 to 100% of an agglomerated, abrasion-resistant amorphous silica powder having a Mohs hardness of 3.0 to 6.0; and a printed layer applied to the surface of said top layer.

* * * * *